INVENTOR
LUCIEN PALYS
BY
ATTORNEYS

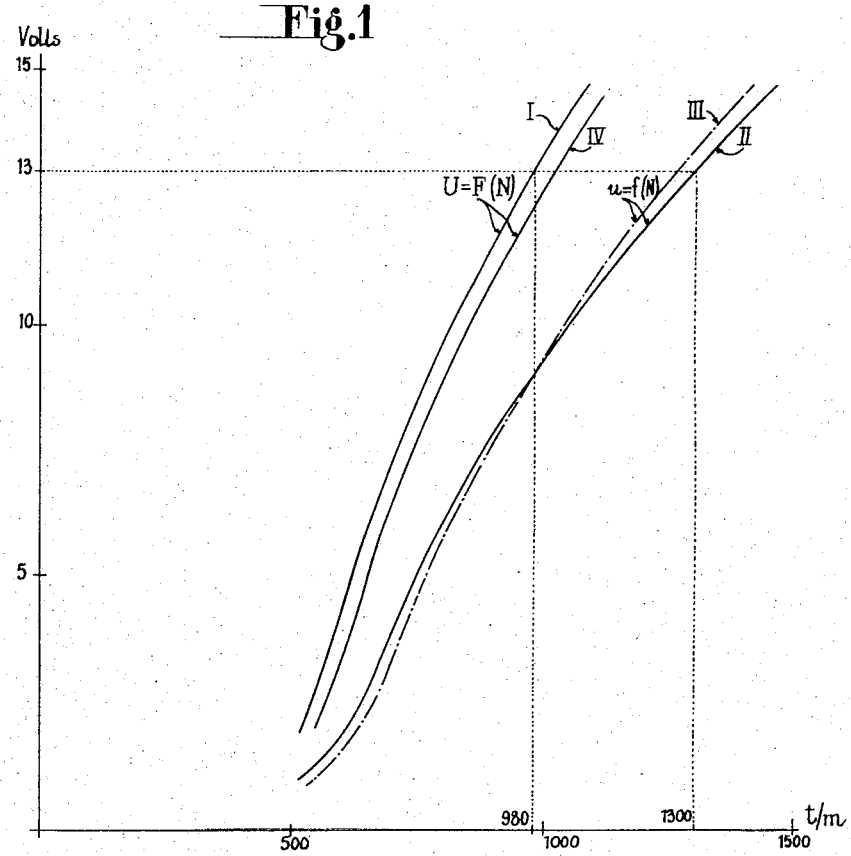
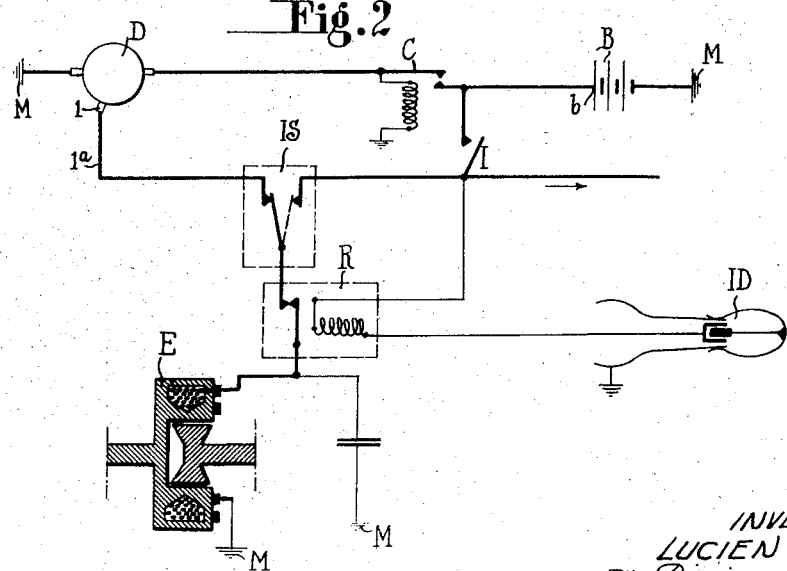

INVENTOR
LUCIEN PALYS
BY Diggins & LeBlanc
ATTORNEYS

United States Patent Office 2,896,757
Patented July 28, 1959

2,896,757

ELECTRIC POWER-SUPPLY DEVICE FOR AUTOMATIC ELECTROMAGNETIC MOTOR VEHICLE CLUTCHES

Lucien Palys, Paris, France, assignor to Societe d'Etudes et d'Applications Industrielles Commerciales et Immobilieres, Inter-Technique, Paris, France, a French body corporate Application March 29, 1957, Serial No. 649,347

Claims priority, application France March 31, 1956

8 Claims. (Cl. 192—3.5)

The present invention relates in a general way to the supply of power to automatic electromagnetic clutches by way of the general electrical circuit of the vehicle which is supplied with electric power by a dynamo and a storage battery.

In a known type of automatic electromagnetic clutch, a progressive coupling means couples a driving shaft to a driven shaft; the coupling is made progressive by varying a magnetic field created between two armatures, of which one is unitary with the driving shaft and the other with the driven shaft. This magnetic field is set up between the armatures by an electric current in a coil fixed in one of the armatures. A disc provided with a suitable material producing solid friction is disposed in the air gap of the electromagnet, that is in the space between the armatures.

In another known type of automatic electromagnetic clutch, the material providing progressive friction is a magnetic powder retained between the two armatures forming the air gap of the electromagnet; variation in the magnetic field created between the two armatures modifies the consistency of the powder, which varies between the powdered state and a state in which it forms a solid block.

The feature common to these two types of clutches and in a general way to automatic electromagnetic clutches, is that they comprise an electromagnetic coil adapted to create the field essential for clutch operation and that this coil is supplied at a voltage $u$ which must be related to the speed $N$ of the motor in accordance with a law $$u = f(N)$$

so that a correct progressive clutch engagement is obtained.

This law may vary with the type of clutch.

In arrangements of known type, the power supply to this coil is taken off the terminals of the generator at voltage U, that is it is connected to the terminal connected to earth and to either the main terminal of the generator or another point in the electric circuit connected to this terminal, whichever is more convenient.

However, it is obvious that the curve $$U = F(N)$$

of the voltage U at the terminals of the generator as a function of the speed N of the motor is not necessarily identical to the law or curve $$u = f(N)$$

required for good clutch operation, since the curve $U = F(N)$ of the generator is designed above all to ensure a satisfactory recharging of the storage battery of the vehicle.

An example of the dissimilarity which in fact exists between these two curves is shown in Fig. 1.

The curve I, corresponding to a dynamo of known type which is on no load and in the cold state, is the curve of the voltage of this dynamo between the main brush and earth as a function of the speed N of the motor in revolutions per minute. The curve II is a similar curve corresponding to satisfactory operation of the above-mentioned electromagnetic clutches. In practice, this curve II may obviously be obtained from a separate generator specially designed for this purpose, but this requires considerable and costly transformation of the electrical system or circuit of the vehicle which the present invention had for its purpose to avoid.

It is known to obtain the curve II from the generator providing the curve I by inserting in the exciting circuit of this generator a suitable resistance R. However, as is known, these new conditions imposed on the dynamo materially modify its operation when under load. Indeed, it can be seen from Fig. 1 that the speed at which the storage battery is connected to the dynamo, corresponding to the voltage $U = 13$ volts, is 980 revolutions per minute on curve I and 1300 revolutions per minute on curve II. In the case of curve II, the connection between the dynamo and battery is therefore considerably delayed, which constitutes a serious disadvantage, since when travelling at reduced speed (for example when travelling through a town) the battery charging time is considerably reduced, while the automatic clutch is added to the other devices consuming electric power. Experience has shown that in vehicles having this arrangement the dynamo cannot ensure a sufficient recharging of the battery.

The object of the invention is to provide a power supply device which utilises a single dynamo for charging the battery and supplying power to the clutch, ensures progressive clutch engagement and has none of the above-mentioned disadvantages.

The device embodying the invention is characterized in that it comprises a dynamo of the type normally utilized in the electrical systems of motor vehicles, said dynamo comprising, in addition to the two main brushes, a third or auxiliary brush suitably displaced relative to the main brushes, and the voltage obtained between one of the main brushes and the auxiliary brush, which is less than that obtained between the two main brushes, is utilized for supplying electric power to the coil of the clutch.

In one embodiment of the invention, there is incorporated in the supply circuit connected to said coil of the automatic clutch by way of said auxiliary brush, a relay which is arranged to connect said coil directly to the battery as soon as the voltage at the auxiliary brush exceeds the voltage necessary to obtain a correct slip-free clutch engagement.

Further features and advantages of the invention will be apparent from the ensuing description with reference to the accompanying drawings, to which the invention is in no way limited.

In the drawings:

Fig. 1 is a diagram of voltage curves as a function of the speed, comprising in addition to the above-mentioned curves I and II, curves III and IV obtained with the device embodying the invention;

Fig. 2 is a diagram of an electrical system incorporating a first embodiment of the invention;

Figure 3:
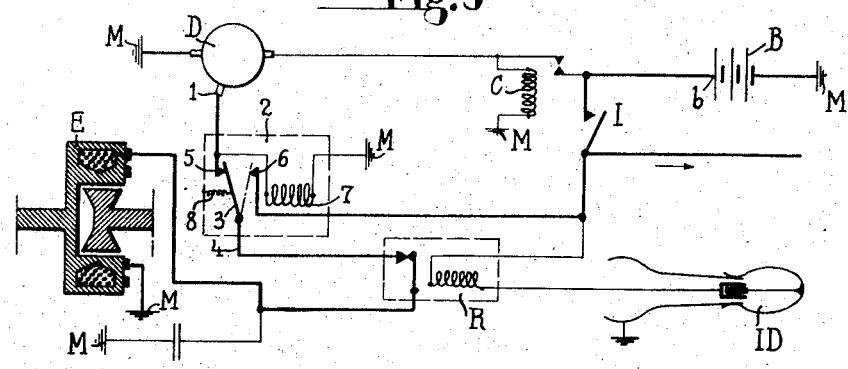
Figure 4:
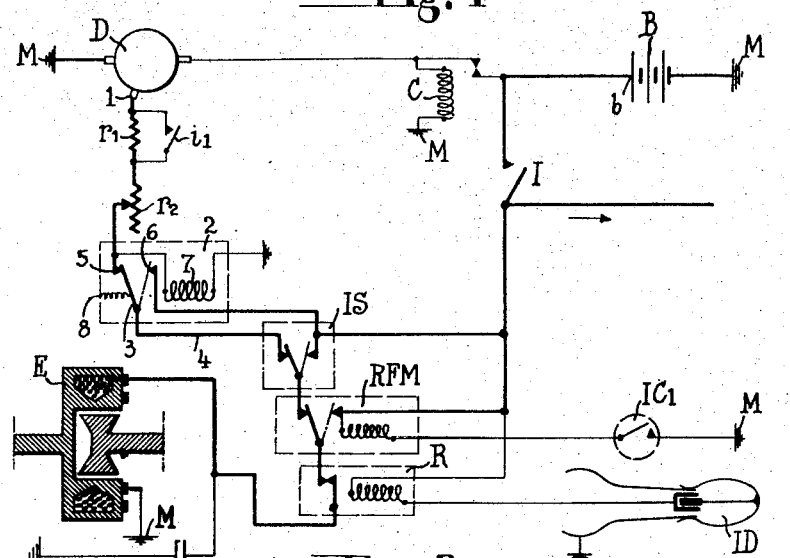
Figure 5:
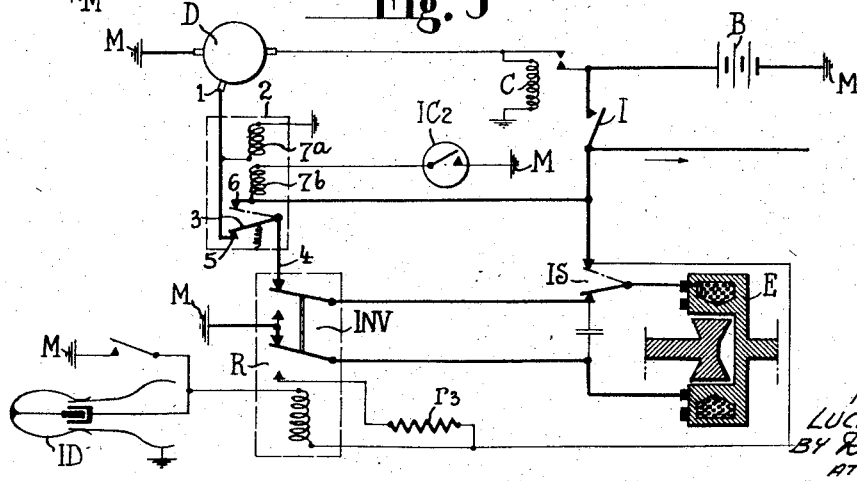
Figure 6:
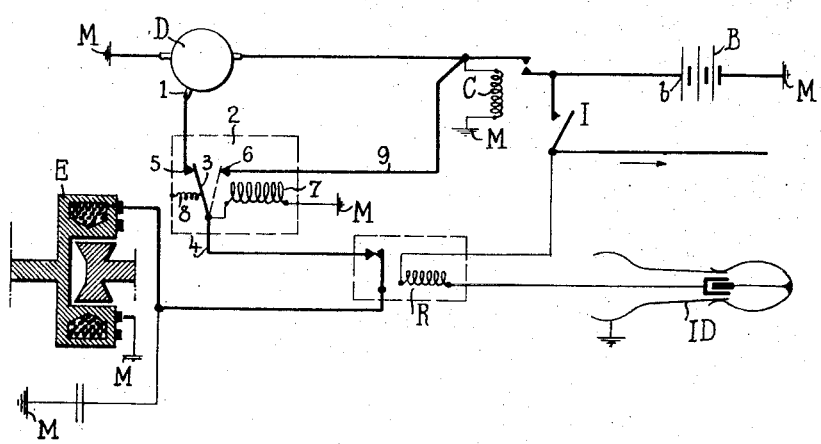
Figure 7:
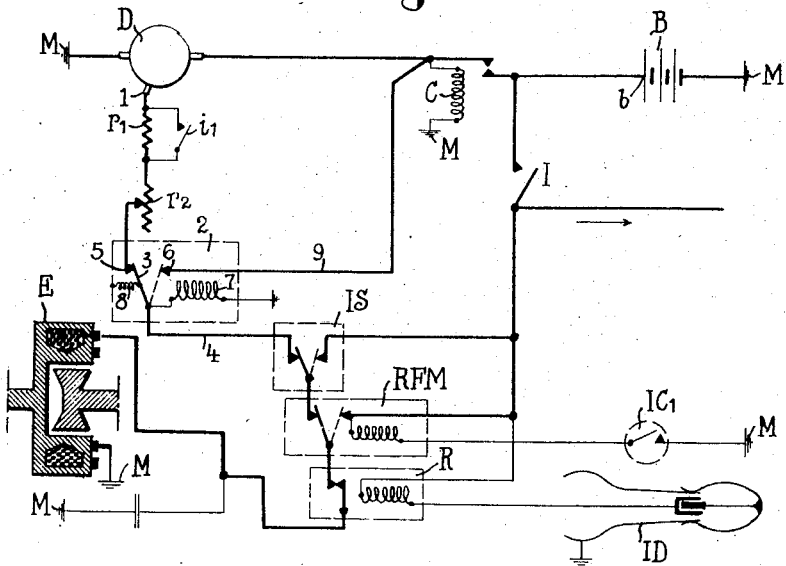

Figs. 3, 4 and 5 are diagrams of three motor vehicle electrical systems incorporating a second embodiment of the invention, and Figs. 6 and 7 are diagrams of modifications of the systems shown in Figs. 3 and 4 respectively.

In the drawings, like elements are designated by like reference characters.

The electrical system of a motor vehicle of the type shown in Fig. 2 comprises a storage battery B, having one of its terminals earthed at M and the other terminal b connected through a cut-out switch C to one of the usual brushes of a dynamo D, and a general switch I. This system is utilized for supplying power to the coil E of an electromagnetic clutch. Power is supplied by means of a relay R controlling the clutch, which relay is controlled by a switch ID connected to the speed-change lever of the vehicle which permits cutting off the exciting current of the coil so as to disengage the clutch when changing speed. This system also comprises a safety reversing switch IS which permits connecting the clutch to the battery in the event of dynamo failure.

The dynamo D comprises an auxiliary brush 1 which supplies power to the coil E through the conductor $I^a$ by means of the above-mentioned devices IS and R.

Thus it is possible to obtain two curves (Fig. 1), one corresponding to the voltage between the auxiliary brush and the earthed brush (curve III), and the other corresponding to the voltage between the main brush and the earthed brush (curve IV), which curves very closely approximate the desired curves II and I.

Experiments have shown that it is possible to obtain a curve $u=f(N)$ which is satisfactory for each automatic electromagnetic clutch engagement, in accordance with the position of the auxiliary brush relative to the main brushes.

The effect of utilization of the auxiliary brush on the main characteristics of the generator varies with the position of the auxiliary brush and the output at the main brushes of the generator, but this influence is practically negligible. Battery charging conditions remain substantially identical to the original conditions irrespective of vehicle utilization.

It will be observed that in the diagram shown in Fig. 2 and in the other diagrams shown in Figs. 3 to 7, the general electrical system of the vehicle is shown as a cut-in switch arrangement instead of a cut-in switch and voltage regulating arrangement. This has been done solely for the sake of clarity and does not mean that the voltage regulator, which is outside the scope of the present invention, has been eliminated.

The system shown in Fig. 3 differs from that shown in Fig. 2 in that the reversing switch IS is replaced by a relay 2 comprising an armature 3, connected by a conductor 4 to the coil E (by means of the above-mentioned relay R), and two fixed studs 5 and 6. The stud 5 is connected to the auxiliary brush 1 and the stud 6 to the non-earthed terminal b of the battery B through the general switch I which is closed as soon as the motor starts up. A coil 7 of the relay 2 is connected between the auxiliary brush 1 and earth.

The armature 3 is ordinarily urged toward the stud 5, for example by the action of a spring 8. Thus, in the inoperative position of the relay 2, the auxiliary brush of the dynamo is directly connected to the clutch coil E. When the motor of the vehicle is running and drives the dynamo at slow speed, the voltage between the auxiliary brush and earth is extremely small and the clutch is in its disengaged condition. When accelerating, the speed of the motor and that of the dynamo increase and the voltage at the auxiliary brush in consequence increases and thus creates in the clutch an increasing magnetic field which permits a progressive coupling in the transmission. Tests with electromagnetic clutches of known type have shown that the period in which there is progressive clutch engagement corresponds to a voltage between ⅙ and ⅔ of the nominal voltage of the electrical system of the vehicle, namely a voltage of 1 to 4 volts for a nominal voltage of 6 volts or a voltage of 2 to 8 volts for a nominal voltage of 12 volts. It is therefore sufficient to set the relay 2 in such manner that the armature 3 thereof is attracted to the position shown in dot-dash line in Fig. 3 at a voltage slightly greater than ⅔ of the nominal voltage, so as to be certain that the nominal torque transmission of the clutch has been obtained before the clutch coil E is connected to the battery. For example, arranging that the relay 2 becomes operative when 10 volts are reached for a nominal voltage of 12 volts should be satisfactory.

Direct connection of the coil E to the battery B avoids, during the running of the motor, wide variations in the torque and above all, at high speeds, dangerous overvoltages across the coil E.

The coil 7 of the relay 2 remains connected between the auxiliary brush of the dynamo and earth and it must be capable of resisting a voltage which might reach a value greater than double the nominal voltage. But the coil 7 is very small, and a sufficient margin of safety can be obtained by making this coil a little larger, which requires but a very small amount of additional material contrary to the requirements for obtaining the same margin of safety in operation of the much larger clutch coil E.

When the vehicle slows down, the voltage at the auxiliary brush decreases and, when it becomes less than the voltage setting of the relay 2, the armature of the latter resumes its left position as seen in Fig. 3 in full line, and the coil E is once more connected to the auxiliary brush of the dynamo. As the speed of the vehicle decreases still more, the voltage drops and the clutch torque decreases and the transmission shaft is no longer driven, which permits the motor to run freely at low speed.

By way of example, Fig. 4 shows use of the same relay 2 in a more complete electrical system of an electromagnetic clutch of known type, which comprises in particular, in addition to the elements shown in Fig. 3, the following elements:

An accelerator resistance $r_1$ which can be short-circuited by a switch $i^1$;

A regulating resistance $r_2$ inserted in the supply circuit;

A safety reverse switch IS which permits connecting the clutch to the battery in the event of dynamo failure;

A relay RFM which permits maintaining the clutch engaged and the transmission coupled and using the motor as a brake when slowing down, for example down to 18 or 20 km. per hour; the coil of this relay is earthed through a centrifugal switch $IC_1$ mounted on the transmission, this switch opening when the speed drops to the above-mentioned speed. The relay 2 operates in the manner described in the first embodiment.

Fig. 5 shows another example of utilization of the invention with an electromagnetic clutch of known type comprising in particular a number of the above-mentioned elements and in which the clutch control relay R is of special type. This relay comprises a reversing switch INV which permits, when disengaging the clutch, passing a current in the opposite direction through the coil E by way of a limiting resistance $r_3$ so as to eliminate the remanent magnetism and cause a more complete clutch disengagement.

In this example the relay 2 comprises two coils $7^a$ and $7^b$ which are coaxial on the same core or side by side on separate cores but which in either case act on the same armature 3. The first coil $7^a$ is connected to the auxiliary brush of the dynamo so as to bring about supply of power by the battery under the above-described conditions; the second coil $7^b$, controlled by a centrifugal switch $IC^2$, permits obtaining a braking action of the motor when slowing down, this switch maintaining the exciting circuit of the coil $7^b$ closed so long as the speed exceeds a certain value, for example 18 to 20 km. per hour.

To avoid risk of high voltage at the terminal of the coil 7 of the relay 2 as shown in Figs. 3 and 4, a slightly different arrangement according to Figs. 6 and 7, which are similar to Figs. 3 and 4 respectively, could be used.

According to this modification, the coil 7 remains connected, at the start of clutch engagement, and during the whole of the period in which there is progressive clutch engagement, to the auxiliary brush of the dynamo, but as soon as the voltage at the third brush reaches the setting voltage of the relay 2, the armature is attracted to the dot-dash position and the clutch and the coil 7 of the relay are connected to the battery through the conductor 9 and the switch C. Considering the ratio between the voltage between the auxiliary brush and earth and the voltage between the main brush and earth, the connection will be obtained in a very positive manner when the setting voltage of the relay 2 is reached at the auxiliary brush.

The coil 7 of this relay will therefore never be subjected to a voltage in excess of that of the battery and it can be constructed without any difficulty.

For decreasing speeds, the blade of the cut-out switch C opens this switch when the voltage of the main brush of the dynamo drops below the battery voltage, and the coil 7 of the relay and the coil E of the clutch are supplied with power through the main brush. As the voltage drops still more and becomes less than the setting voltage of the relay 2, the armature of the latter is no longer attracted and resumes its left position shown in full line. The coils 7 and E are once more connected to the auxiliary brush of the dynamo and the clutch engagement cycle is ready to recommence for a new acceleration.

Although specific embodiments of the invention have been described, many modifications and changes may be made therein without departing from the scope of the invention as defined in the appended claims.

Having now described my invention what I claim as new and desire to secure by Letters Patent is:

1. In an electrical system of a motor vehicle of the type comprising a storage battery, a dynamo having two main brushes, a cut-out switch coupling said battery to said main brushes of said dynamo, and an electromagnetic clutch having a control coil; an auxiliary brush disposed on said dynamo and so positioned relative to said main brushes as to obtain a voltage lower than that obtained between said main brushes, and connecting means for supplying power from said dynamo to said clutch control coil through said auxiliary brush.

2. In an electrical system of a motor vehicle of the type comprising a storage battery, a dynamo having two main brushes, a cut-out switch coupling said battery to said main brushes of said dynamo, and an electromagnetic clutch having a control coil; an auxiliary brush disposed on said dynamo and so positioned relative to said main brushes as to obtain a voltage lower than that obtained between said main brushes, and connecting means for supplying power from said dynamo to said clutch control coil through said auxiliary brush, and a relay inserted in the connecting means supplying power to said clutch control coil through said auxiliary brush, said relay being arranged for connecting said control coil directly to the battery as soon as the voltage at said auxiliary brush exceeds the voltage necessary for obtaining a correct non-slip engagement of the electromagnetic clutch.

3. In an electrical system of a motor vehicle of the type comprising a storage battery, a dynamo having two main brushes, a cut-out switch coupling said battery to said main brushes of said dynamo, and an electromagnetic clutch having a control coil; an auxiliary brush disposed on said dynamo and so positioned relative to said main brushes as to obtain a voltage lower than that obtained between said main brushes, and connecting means for supplying power from said dynamo to said clutch control coil through said auxiliary brush, and a relay inserted in the connecting means supplying power to said clutch control coil through said auxiliary brush, said relay being arranged for connecting said control coil directly to the battery as soon as the voltage at said auxiliary brush exceeds the voltage necessary for obtaining a correct non-slip engagement of the electromagnetic clutch, said relay comprising an exciting coil connected between said auxiliary brush and earth.

4. In an electrical system of a motor vehicle of the type comprising a storage battery, a dynamo having two main brushes, a cut-out switch, and an electromagnetic clutch having a control coil; an auxiliary brush disposed on said dynamo and so positioned relative to said main brushes as to obtain a voltage lower than that obtained between said main brushes, and connecting means for supplying power to said clutch control coil through said auxiliary brush, and a relay inserted in the connecting means supplying power to said clutch control coil through said auxiliary brush, said relay being arranged for connecting said control coil directly to the battery as soon as the voltage at said auxiliary brush exceeds the voltage necessary for obtaining a correct non-slip engagement of the electromagnetic clutch, said relay comprising an exciting coil connected between a movable armature and earth, said movable armature being movable between two fixed studs and being also connected to said clutch control coil through the medium of a clutch disengaging relay which is controlled by the speed change lever of the vehicle, and connecting means connecting one of said fixed studs to said auxiliary brush and connecting the other of said studs to the storage battery through the medium of said cut-out switch, whereby said exciting coil is connected to the battery at the same time as said clutch control coil.

5. In an electrical system of a motor vehicle of the type comprising a storage battery, a dynamo having two main brushes, a cut-out switch coupling said battery to said main brushes of said dynamo, and an electromagnetic clutch having a control coil, said electromagnetic clutch being adapted to be supplied at a voltage $u$ which must be related to the speed N of the motor in accordance with a law $u=f(N)$ in order to obtain a correct progressive clutch engagement, said voltage $u$ being, for any value of N, lower than the voltage U available at the terminals of the dynamo; an auxiliary brush disposed on said dynamo, and so positioned relative to said main brushes as to obtain, for each value of N, a voltage lower than that obtained between said main brushes, said lower voltage being substantially equal to the required voltage $u$, and connecting means for applying power from said dynamo to said clutch control coil through said auxiliary brush.

6. In an electrical system of a motor vehicle of the type comprising a storage battery, a dynamo having two main brushes, a cut-out switch coupling said battery to said main brushes of said dynamo, and an electromagnetic clutch having a control coil, said electromagnetic clutch being adapted to be supplied at a voltage $u$ which must be related to the speed N of the motor in accordance with a law $u=f(N)$ in order to obtain a correct progressive clutch engagement, said voltage $u$ being, for any value of N, lower than the voltage U available at the terminals of the dynamo; an auxiliary brush disposed on said dynamo, and so positioned relative to said main brushes as to obtain, for each value of N, a voltage lower than that obtained between said main brushes, said lower voltage being substantially equal to the required voltage $u$, and connecting means for applying power from said dynamo to said clutch control coil through said auxiliary brush and a relay inserted in the connecting means supplying power to said clutch control coil through said auxiliary brush, said relay being arranged for connecting said control coil directly to the battery as soon as the voltage at said auxiliary brush exceeds said voltage necessary for obtaining a correct non-slip engagement of the electromagnetic clutch.

7. In an electrical system of a motor vehicle of the type comprising a storage battery, a dynamo having two main brushes, a cut-out switch coupling said battery to said main brushes of said dynamo, and an electromagnetic clutch having a control coil, said electromagnetic clutch being adapted to be supplied at a voltage $u$ which must be related to the speed N of the motor in accordance with a law $u=f(N)$ in order to obtain a correct progressive clutch engagement, said voltage $u$ being, for any value of N, lower than the voltage U available at the terminals of the dynamo; an auxiliary brush disposed on said dynamo, and so positioned relative to said main brushes as to obtain, for each value of N, a voltage lower than that obtained between said main brushes, said lower voltage being substantially equal to the required voltage $u$, and connecting means for applying power from said dynamo to said clutch control coil through said auxiliary brush, and a relay inserted in the connecting means supplying power to said clutch control coil through said auxiliary brush, said relay being arranged for connecting said control coil directly to the battery as soon as the voltage at said auxiliary brush exceeds the voltage necessary for obtaining a correct non-slip engagement of the electromagnetic clutch, said relay comprising an exciting coil connected between said auxiliary brush and earth.

8. In an electrical system of a motor vehicle of the type comprising a storage battery, a dynamo having two main brushes, a cut out switch, and an electromagnetic clutch having a control coil, said electromagnetic clutch being adapted to be supplied at a voltage $u$ which must be related to the speed N of the motor in accordance with a law $u=f(N)$ in order to obtain a correct progressive clutch engagement, said voltage $u$ being, for any value of N, lower than the voltage U available at the terminals of the dynamo; an auxiliary brush disposed on said dynamo, and so positioned relative to said main brushes as to obtain, for each value of N, a voltage lower than that obtained between said main brushes, said lower voltage being substantially equal to the required voltage $u$, and connecting means for applying power to said clutch control coil through said auxiliary brush, and a relay inserted in the connecting means supplying power to said clutch control coil through said auxiliary brush, said relay being arranged for connecting said control coil directly to the battery as soon as the voltage at said auxiliary brush exceeds the voltage necessary for obtaining a correct non-slip engagement of the electromagnetic clutch, said relay comprising an exciting coil connected between a movable armature and earth, said movable armature being movable between two fixed studs and being also connected to said clutch control coil through the medium of a clutch disengaging relay which is controlled by the speed change lever of the vehicle, and connecting means connecting one of said fixed studs to said auxiliary brush and connecting the other of said studs to the storage battery through the medium of said cut-out switch, whereby said exciting coil is connected to the battery at the same time as said clutch control coil.

References Cited in the file of this patent

UNITED STATES PATENTS

| | | |
|---|---|---|
| 1,303,484 | Langdon-Davies | May 13, 1919 |
| 2,148,482 | Lorenz | Feb. 28, 1939 |
| 2,688,388 | Gill | Sept. 7, 1954 |
| 2,714,435 | D'Ozouville | Aug. 2, 1955 |
| 2,718,157 | Schaub | Sept. 29, 1955 |
| 2,760,610 | Prachar | Aug. 28, 1956 |

FOREIGN PATENTS

| | | |
|---|---|---|
| 610,519 | Great Britain | Oct. 18, 1948 |